TEMPERATURE RESPONSIVE CIRCUIT

Filed April 30, 1964 2 Sheets-Sheet 1

INVENTORS
ALLAN DAVID BERRY
DUŠAN VUČINIĆ
BY Kurtz, Kurtz & Ottinger
ATTORNEYS

INVENTORS
ALLAN DAVID BERRY
DUŠAN VUČINIĆ
BY Kurucheng, Ferguson & ... Attys
ATTORNEYS United States Patent Office 3,353,103
Patented Nov. 14, 1967

3,353,103

TEMPERATURE RESPONSIVE CIRCUIT

Allan David Berry, Coventry, and Dušan Vučinić, Nuneaton, England, assignors to The General Electric Company Limited, London, England Filed Apr. 30, 1964, Ser. No. 363,724
Claims priority, application Great Britain, May 15, 1963, 19,328/63
3 Claims. (Cl. 328—3)

ABSTRACT OF THE DISCLOSURE

A variable attenuator incorporating a first temperature controlled impedance whose value governs the gain of the attenuator and is varied by a heating current derived from a supply circuit, a second temperature controlled impedance interconnected with the first impedance to compensate for ambient temperature changes when the temperature of the first impedance has a first nominal value, and a third temperature controlled impedance connected in the supply circuit to compensate for ambient temperature changes when the temperature of the first impedance has a second nominal value.

This invention relates to electric signal translating circuits.

The invention relates particularly to electric signal translating circuits of the kind incorporating a temperature controlled impedance arranged to vary the gain of the circuit under the control of a current which is arranged to heat said impedance.

In such a circuit the effect on the value of the impedance of a change in ambient temperature may vary with the temperature of the impedance. As a result, it may be difficult to provide in such a circuit, adequate compensation against changes in ambient temperature if the temperature of the impedance varies widely in operation.

It is an object of the present invention to provide a circuit of the kind specified wherein this difficulty is to some extent overcome.

According to the present invention, a circuit of the kind specified includes temperature compensating means including: a second temperature controlled impedance interconnected with said first-mentioned impedance with arranged to compensate for the effect on said first impedance of changes in the ambient temperature when the temperature of said first-mentioned impedance has a first nominal value; and a third temperature controlled impedance connected in a supply circuit via which a current arranged to heat said first impedance is supplied in operation, said third impedance being arranged to effect, in conjunction with said second impedance, compensation for the effect on said first impedance of changes in the ambient temperature when the temperature of said first impedance has been changed to a second nominal value, different from said first nominal value, due to a change in the value of the current supplied via said supply circuit.

Two arrangements in accordance with the invention will now be described, by way of example, with reference to the accompanying drawing in which.

The amplifier is arranged to amplify signals in the frequency range 60 kilocycles per second to 108 kilocycles per second and the input signal to the amplifier includes a pilot signal, at a frequency of 84.080 kilocycles per second, which is utilised in the amplifier for automatic gain control purposes.

Figure 1:
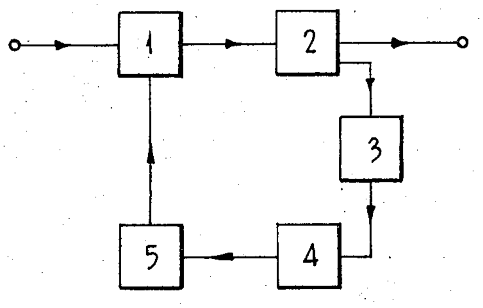
FIGURE 1 is a block schematic diagram of a group amplifier forming part of a carrier telephony system.

Referring now to FIGURE 1 of the drawings, the input signal to the amplifier is fed via a variable attenuator 1 to a conventional amplifying circuit 2, from whose output the output of the amplifier is derived. The pilot signal is separated from the signal appearing at the output of the circuit 2 by means of a band pass filter 3, after which it is amplified, rectified and smoothed in conventional circuits 4. The resulting unidirectional voltage is fed to a control circuit 5 where it is utilised, in a manner described below, to produce a control signal. The control signal is fed to the variable attenuator 1 where it is arranged to vary the attenuation produced by the attenuator so as to effect the desired automatic control of the overall gain of the amplifier.

Figure 2:
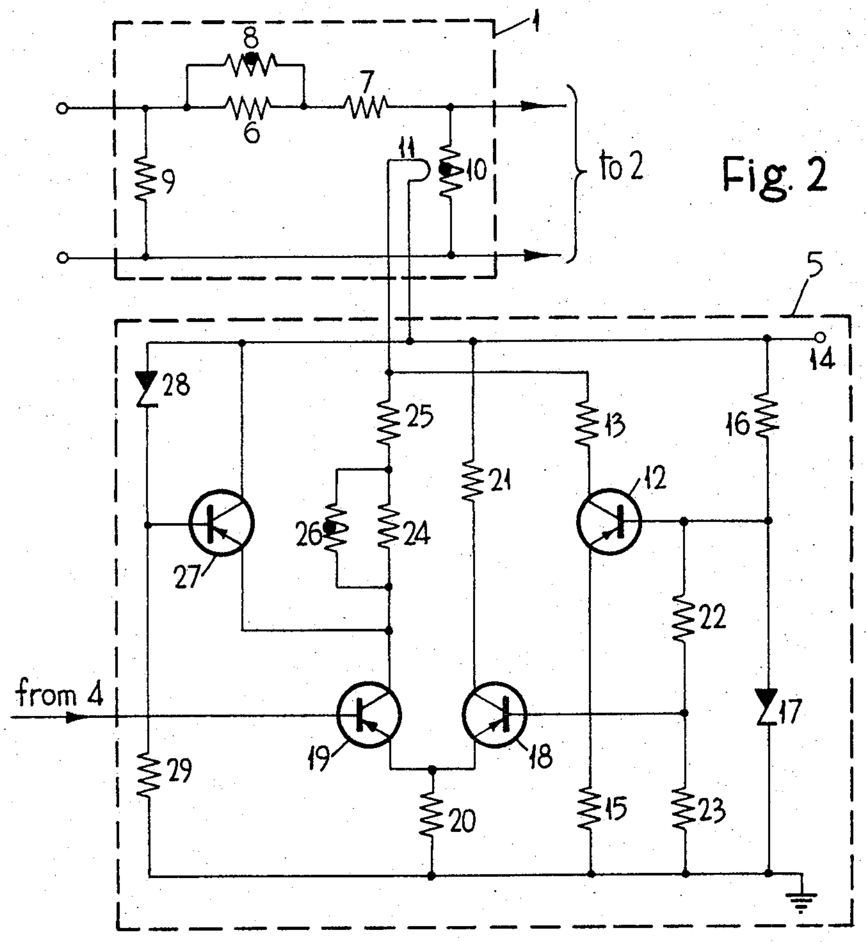
FIGURE 2 is a circuit diagram of one form of part of the amplifier shown in FIGURE 1.

Referring now to FIGURE 2, in the first arrangement to be described the variable attenuator 1 is in the form of resistive 40 network. The series arm of the network is constituted by two series connected resistors 6 and 7, one of which (6) is shunted by a thermistor 8 having a negative temperature coefficient. The input and output shunt arms of the network are respectively constituted by a resistor 9 and a second thermistor 10 having a negative temperature coefficient. The thermistor 10 serves as the controlling element of the attenuator 1 and is arranged to be heated by an electric resistance heater 11 which is energised by current derived from the control circuit 5.

The control circuit includes a first P-N-P junction transistor 12 arranged to supply a nominally constant current to the heater 11. To this end, the collector of the transistor 12 is connected via a resistor 13 to one end of the heater 11 and the other end of the heater 11 is connected to a terminal 14 which is maintained, in operation, at a potential negative with respect to earth. The emitter of the transistor 12 is connected to earth via a resistor 15 and the base of the transistor 12 is connected to the junction between a resistor 16 and a zener diode 17 which are connected in series, in the order stated, between the terminal 14 and earth. The diode 17 is biassed in the reverse direction beyond breakdown in operation, thus maintaining the base of the transistor 12 at a substantially constant potential which is negative with respect to earth.

The control circuit 5 further includes two P-N-P junction transistors 18 and 19 connected as a long-tailed pair, the emitters of the transistors 18 and 19, being connected to earth via a common resistor 20. The collector of the transistor 18 is connected to the terminal 14 via a resistor 21 and the base of the transistor 18 is connected to the junction between two resistors 22 and 23 connected in series across the diode 17, the base being thus maintained at a constant potential in operation which is negative with respect to earth. The unidirectional voltage appearing at the output of the circuit 4 is applied between the base of the transistor 19 and earth, in such a sense as to bias the base negatively with respect to earth, and the collector of the transistor 19 is connected to the end of the heater 11 remote from the terminal 14 via two resistors 24 and 25 connected in series, one of which (24) is shunted by a thermistor 26 having a negative temperature coefficient.

The circuit 5 also includes a fourth P-N-P junction transistor 27, whose collector and emitter are respectively connected to the terminal 14 and the collector of the transistor 19, and whose base is connected to the junction between a zener diode 28 and a resistor 29 connected in series, in the order stated, between the terminal 14 and earth. The diode 28 is biassed in the reverse direction beyond breakdown in operation so that the base of the transistor 27 is maintained at a constant potential, positive with respect to the terminal 14.

In operation of the amplifier, when the magnitude of the pilot signal at the input of the amplifier is —35 dbm or less, the magnitude of the voltage applied between the base of the transistor 19 and earth is such that the transistor 19 is cut-off and the transistor 18 is conducting. The heater 11 is, therefore, supplied with current from the transistor 12 only. The resistance of the thermistor 10 and the gain of the amplifier as a whole consequently remain nominally constant. The thermistor 8 serves to compensate for the effect of changes in the resistance of the thermistor 10 due to changes in its temperature resulting directly from changes in the ambient temperature, and also for changes in the resistance of the thermistor 10 due to changes in the current through the heater 11 resulting from the effect of changes in the ambient temperature on the transistor 12 and the diode 17.

When the magnitude of the pilot signal at the input to the amplifier exceeds —35 dbm, the transistor 19 conducts to a degree depending on the amount by which the magnitude of the pilot signal at the input exceeds —35 dbm. The current supplied to the heater 11 is thus similarly increased, and as a result, the attenuation of the attenuator 1 increases with increasing signal input magnitude; only a very small increase in output signal magnitude above that obtained when the pilot signal at the input of the amplifier has a value of —35 dbm is thus possible.

As the collector current of the transistor 19 increases, the potential at the emitter of the transistor 27 changes positively with respect to the potential at its base until, when the pilot signal at the input of the amplifier has a magnitude of —25 dbm, the transistor 27 starts to conduct. The transistor 27 thereafter prevents further rise in the voltage across the series connection of the resistors 24 and 25 and the heater 11. Any substantial change in the current through the heater 11 when the pilot signal at the input has a magnitude above —25 dbm is thus prevented. The overall gain of the amplifier thus remains substantially constant, when the pilot signal magnitude exceeds —25 dbm, at the value it has when the pilot signal magnitude is equal to —25 dbm.

The thermistor 8 continues to provide a measure of compensation against changes in the ambient temperature when the input pilot signal exceeds —25 dbm. However, because the temperature of the thermistor 10 is higher than when the pilot signal was below —35 dbm, additional temperature compensation is required when the pilot signal is above —25 dbm. This is provided by the thermistor 26 which serves to vary the current in the heater 11 with changes in the ambient temperature.

It is pointed out that the thermistor 26 is entirely inoperative when the pilot signal is below —35 dbm. In consequence, the selection of suitable characteristics for the thermistors 8 and 26 and the choice of suitable values for the resistors 6 and 7 associated with the thermistors 8 and the resistors 24 and 25 associated with the thermistor 26, is considerably simplified.

The resistors 13 and 21 serve only to limit the collector voltages of the transistors 12 and 18 respectively.

Figure 3:
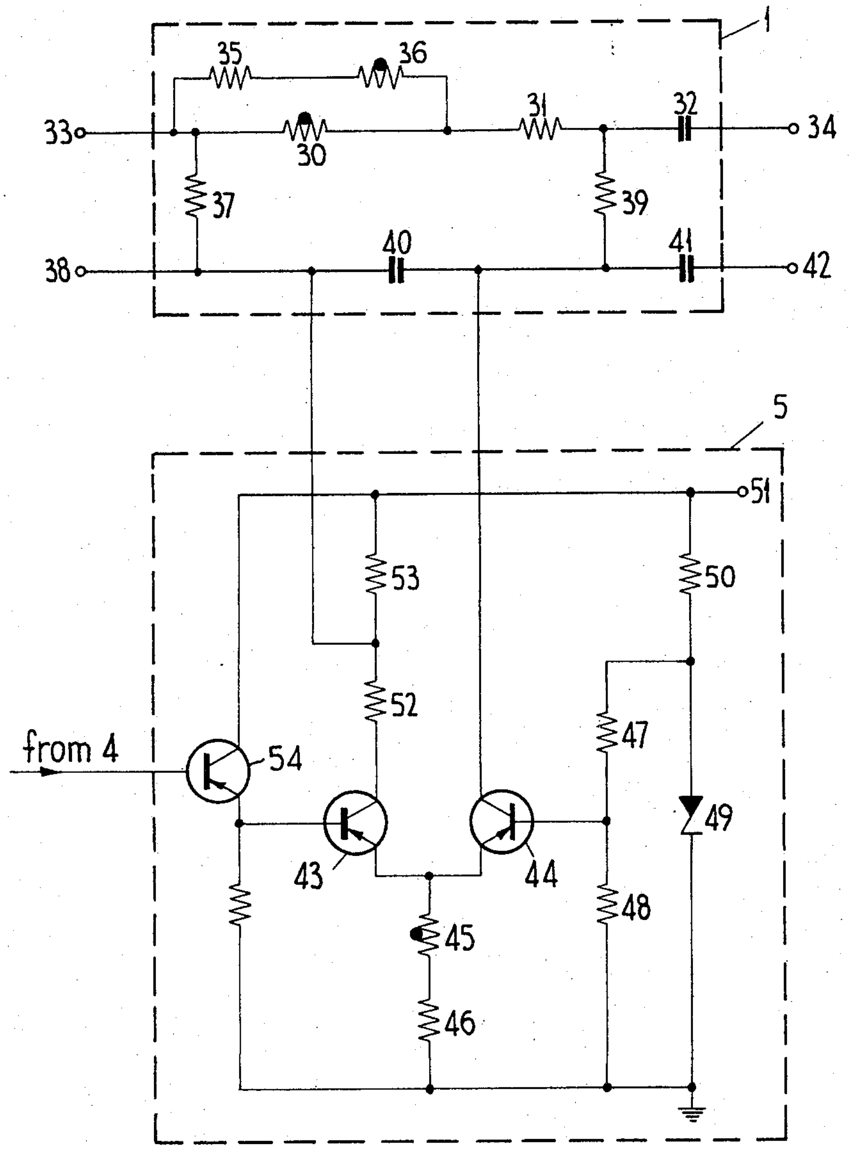
FIGURE 3 is a circuit diagram of a second form of part of the amplifier shown in FIGURE 1.

Referring now to FIGURE 3, in the second arrangement to be described the variable attenuator 1 is in the form of a $\pi$ network the series arm of which comprises a thermistor 30 having a negative temperature coefficient a resistor 31 and a capacitor 32, connected in series in the order stated between a first input terminal 33 and a first output terminal 34, and a resistor 35 and a nickel wire wound resistor 36 having a positive temperature, connected in series between the ends of the thermistor 30. The input shunt arm of the network is constituted by a resistor 37 connected between the terminal 33 and a second input terminal 38, and the output shunt arm of the network is constituted by a resistor 39 connected between the junction between the resistor 31 and the capacitor 32 and the junction between two further capacitors 40 and 41 connected in series between the terminal 38 and a second output terminal 42. The thermistor 30 serves as the controlling element of the attenuator and is arranged to be directly heated by current derived from the control circuit 5.

The control circuit 5 comprises two P-N-P junctions transistors 43 and 44 connected as a long-tailed pair, the emitters of the transistors being connected to earth via a nickel wire wound resistor 45 having a positive temperature coefficient and a resistor 46 connected in series. The collector of the transistor 44 is connected to one terminal of the capacitor 40 and the base of the transistor is connected to the junction between two resistors 47 and 48 connected in series across a Zener diode 49, one electrode of the diode 49 being earthed and the other electrode of the diode 49 being connected via a resistor 50 to a terminal 51 which is maintained at a constant potential in operation, negative with respect to earth. The diode 49 is biassed in the reverse direction beyond breakdown in operation, thus maintaining the base of the transistor 44 at a substantially constant potential, negative with respect to earth. The collector of the transistor 43 is connected to the terminal 51 via two resistors 52 and 53 connected in series and the junction between the resistors 52 and 53 is connected to the other terminal of the capacitor 40.

The unidirectional voltage appearing at the output of the circuit 4 is applied between the base of the transistor 43 and earth via a further transistor 54 connected in an emitter-follower arrangement, the transistor 54 serving only to increase the impedance presented by the control circuit 5 to the circuit 4.

In operation of the amplifier, when the magnitude of the pilot signal at the input of the amplifier is —35 dbm or less, the magnitude of the voltage appearing between the base of the transistor 43 and earth is such that the transistor 43 is cut-off and the transistor 44 is conducting, the collector current of the transistor 44 having a nominally constant value depending on the values of the resistor 46 and the resistor 45 and the voltage appearing across the diode 49. A fraction of the collector current of the transistor 44 flows through the thermistor 30 so that the resistance of the thermistor 30, and hence the gain of the amplifier as a whole, is nominally constant at a value dependent largely on the value of the resistor 31, the thermistor 30 having a relatively low value. The resistor 45, and to a lesser extent the resistor 36, serve to compensate for the effect of changes in the resistance of the thermistor 30 resulting directly from changes in the ambient temperature. In addition, the resistor 45 serves to compensate for the effect of changes in the ambient temperature on the transistor 44 and the diode 49.

When the magnitude of the pilot signal exceeds —35 dbm, the transistor 43 conducts to a degree depending on the amount by which the magnitude of the pilot signal exceeds —35 dbm, and the collector current of the transistor 44 is correspondingly reduced. The current flowing through the thermistor 30 is thus reduced, and as a result the attenuation of the attenuator 1 increases with increasing input signal magnitude. Only a very small increase in output signal magnitude above that obtained when the pilot signal has a value of —35 dbm is thus possible.

When the magnitude of the pilot signal exceeds —25 dbm, the transistor 44 is cut-off and so no control current flows through the thermistor 30. The resistance of the thermistor 30, and hence the gain of the amplifier, thus remain nominally constant when the pilot signal magnitude exceeds —25 dbm. The temperature of the thermistor 30 is now much lower than when the pilot signal was below —35 dbm and the resistor 36 alone provides adequate compensation for the effect of changes in ambient temperature on the thermistor 30.

It will be noticed that the resistor 45 has no effect on the attenuation produced by the attenuator when the pilot signal is above —25 dbm, thus facilitating choice of the values of the various components of the arrangement to achieve the desired amplifier gain and temperature compensation.

It will be appreciated that the capacitors 32, 40 and 41 serve merely to restrict the flow of D.C. currents in the attenuator to a path including the thermistor 30.

It will be understood that in the arrangement described above with reference to FIGURES 1 and 3, the thermistor 30 may be replaced by an indirectly heated thermistor. Similarly, the indirectly heated thermistor 10 used in the arrangement described with reference to FIGURES 1 and 2 may be replaced by a directly heated thermistor.

We claim:

1. A temperature responsive variable attenuator and control circuit comprising: first and second temperature controlled impedances; means interconnecting said impedances in said attenuator such that the gain of the attenuator depends primarily on the temperature of the first impedance and compensation for the effect on said first impedance of changes in ambient temperature is effected by said second impedance when the temperature of said first impedance has a first nominal value; a current supply circuit for supplying a current of variable magnitude; means for utilizing said current to heat said first impedance; a third temperature controlled impedance; and means interconnecting said third impedance with said supply circuit so that, when the current supplied by said supply circuit has a nominal value such that the temperature of the first impedance has a second nominal value different from said first nominal value, the value of said current varies with the value of said third impedance, thereby to effect, in conjunction with said second impedance, compensation for the effect of changes in ambient temperature on said first impedance when the temperature of said first impedance has said second nominal value.

2. A circuit according to claim 1 wherein said third impedance is connected in a path via which at least part of said current supplied via said supply circuit flows when the temperature of said first impedance has its second nominal value.

3. A circuit according to claim 1 wherein said supply circuit includes: means to maintain the magnitude of the current supplied by said supply circuit at a first nominal value when the magnitude of the input signal to the circuit lies on one side of a range of values, thereby substantially to maintain the temperature of said first impedance at said first nominal value, and hence to maintain the gain of the circuit at a first value; means to vary the magnitude of the current supplied by said supply circuit with the magnitude of the input signal over said range of values of the magnitude of the input signal thereby to vary the gain of the circuit in such a manner as to maintain the magnitude of the output signal of the circuit substantially constant over said range of values of input signal magnitudes; and means to maintain the magnitude of the current supplied by said supply circuit at a second nominal value when the magnitude of the input signal to the circuit lies on the other side of said range of values, thereby substantially to maintain the temperature of said first impedance at said second nominal value, and hence to maintain the gain of the circuit at a second value.

References Cited

UNITED STATES PATENTS

| | | | |
|---|---|---|---|
| 2,660,625 | 11/1953 | Harrison | 333—17 |
| 3,218,570 | 11/1965 | Godier | 330—143 |
| 3,222,609 | 12/1965 | Ulmer et al. | 330—23 |

JOHN S. HEYMAN, *Examiner.*

ARTHUR GAUSS, *Primary Examiner.*